United States Patent
Gardner

(10) Patent No.: US 10,437,655 B2
(45) Date of Patent: Oct. 8, 2019

(54) HARDWARE-LOCKED ENCRYPTED BACKUP

(71) Applicant: Analog Devices, Inc., Norwood, MA (US)

(72) Inventor: Douglas J. Gardner, Palm Harbor, FL (US)

(73) Assignee: Analog Devices, Inc., Norwood, MA (US)

( * ) Notice: Subject to any disclaimer, the term of this patent is extended or adjusted under 35 U.S.C. 154(b) by 157 days.

(21) Appl. No.: 15/504,124

(22) PCT Filed: Aug. 15, 2015

(86) PCT No.: PCT/US2015/004543
§ 371 (c)(1),
(2) Date: Feb. 15, 2017

(87) PCT Pub. No.: WO2016/025931
PCT Pub. Date: Feb. 18, 2016

(65) Prior Publication Data
US 2017/0277580 A1 Sep. 28, 2017

Related U.S. Application Data

(60) Provisional application No. 62/037,928, filed on Aug. 15, 2014.

(51) Int. Cl.
*G06F 11/00* (2006.01)
*G06F 11/14* (2006.01)
*G06F 21/62* (2013.01)

(52) U.S. Cl.
CPC ........ *G06F 11/006* (2013.01); *G06F 11/1456* (2013.01); *G06F 11/1458* (2013.01); *G06F 21/6245* (2013.01)

(58) Field of Classification Search
CPC .... G06F 11/006; G06F 21/6245; G06F 21/34; G06F 11/1456
See application file for complete search history.

(56) References Cited

U.S. PATENT DOCUMENTS

2009/0113220 A1   4/2009  Lee et al.
2009/0262926 A1  10/2009  Kabra et al.
(Continued)

FOREIGN PATENT DOCUMENTS

WO    WO 2013/107593 A1    7/2007

OTHER PUBLICATIONS

International Search Report and Written Opinion dated Dec. 22, 2015 for Application No. PCT/US2015/045431.
(Continued)

*Primary Examiner* — Farid Homayounmehr
*Assistant Examiner* — Suman Debnath
(74) *Attorney, Agent, or Firm* — Wolf, Greenfield & Sacks, P.C.

(57) ABSTRACT

A hardware-locked encrypted backup (HWLE-BU) that is locked to a single hardware device using the device's unique hardware identity, based on a Physically-Unclonable Function (PUF) or other suitable means providing a unique hardware identity. The HWLE-BU is bound to a specific hardware identity such that only the physical device that created the HWLE-BU can decrypt it, i.e., restoring HWLE-BU data requires utilizing the same physical hardware device in the decryption process.

20 Claims, 2 Drawing Sheets

[critical data] Origin → Intermediary A → $PUF_B$ Intermediary B → $PUF_C$ Intermediary C → Endpoint

(56) References Cited

U.S. PATENT DOCUMENTS

| | | | |
|---|---|---|---|
| 2012/0233454 A1* | 9/2012 | Rollins | G06F 21/602 |
| | | | 713/150 |
| 2013/0142329 A1 | 6/2013 | Bell et al. | |
| 2013/0311789 A1* | 11/2013 | Johnson | G06F 12/1408 |
| | | | 713/193 |

OTHER PUBLICATIONS

International Preliminary Report on Patentability dated Jul. 14, 2016 for Application No. PCT/US2015/045431.

\* cited by examiner

HARDWARE-LOCKED ENCRYPTED BACKUP

CROSS-REFERENCE TO RELATED APPLICATIONS

This application is the U.S. National Stage of International Patent Application Number PCT/US2015/045431, entitled "HARDWARE-LOCKED ENCRYPTED BACKUP," filed Aug. 15, 2015, which claims priority to and the benefit of U.S. provisional patent application Ser. No. 62/037,928, entitled "HARDWARE-LOCKED ENCRYPTED BACKUP," filed Aug. 15, 2014. The entire contents of the foregoing are hereby incorporated herein by reference.

BACKGROUND

Securely protecting computer backups of data continues to be an area full of security concerns. When created, backups typically need to be stored in a format that can be restored at an unknown later date. Many things can change in the computer environment during the period between backup and restore, such as: changing or updating of operating system, changing of hardware components (hard drives, motherboards, network cards, etc.), virtualization of systems, changing of user IDs and passwords, etc. The ever-changing environment makes it difficult to backup computer data in a way that can be restored at a later date.

To avoid additional restore complications, many computer backups are created with no or limited security protection. Even if security is enabled, the IT administrators may have access to all the keys and therefore access to the data in a decrypted form. In the case of critical/classified protected data, IT administrators may not be authorized to access such data, and creating a useable system that protects the critical/classified data from IT administrator access becomes a difficult task.

Classified and other secure environments also impose chain of custody, accounting, and policy restrictions. These restrictions can prohibit creating copies of critical data unless the critical data is destroyed from a transferring system or device upon transfer of a copy to a receiving system or device, making it difficult to robustly protect critical data for restoration.

SUMMARY

The hardware-locked encrypted backup (HWLE-BU) is an encrypted backup that is locked to a single hardware device. The HWLE-BU is encrypted using the device's unique hardware identity, based on a Physically-Unclonable Function (PUF) or other means that provides a unique hardware identity and meets a system's required level of security. By cryptographically binding the HWLE-BU to a specific hardware identity, the only physical device that can decrypt the HWLE-BU is the exact hardware that it was created for. That is, the only way to decrypt and restore the HWLE-BU data is to have access to the exact physical hardware device and utilize it in the decryption process.

BRIEF DESCRIPTION OF THE DRAWINGS

FIGS. 1-9 are a sequence of system diagrams illustrating an embodiment of a method of transferring critical data from an origin to an endpoint through a series of (three) intermediaries A, B, and C, destroying critical data in the intermediaries as it is transferred through them, but utilizing hardware-locked encrypted backups, wherein:

FIG. 1 depicts an initial state wherein only the origin possesses the critical data;

FIG. 2 depicts the transfer of a copy of the critical data from the origin to intermediary A;

FIG. 3 depicts the transfer of a copy of the critical data (and destruction) from intermediary A to intermediary B;

FIG. 4 depicts the creation of a hardware-locked encrypted backup by intermediary B using its $PUF_B$;

FIG. 5 depicts the transfer of a copy of intermediary B's hardware-locked encrypted backup back to intermediary A;

FIG. 6 depicts the transfer of a copy of the critical data (and destruction) from intermediary B to intermediary C;

FIG. 7 depicts the creation of a hardware-locked encrypted backup by intermediary C using its $PUF_C$;

FIG. 8 depicts the transfer of a copy of intermediary C's hardware-locked encrypted backup back to intermediary B; and FIG. 9 depicts the transfer of a copy of the critical data (and destruction) from intermediary C to the endpoint.

DETAILED DESCRIPTION OF EMBODIMENTS

Figure 1:
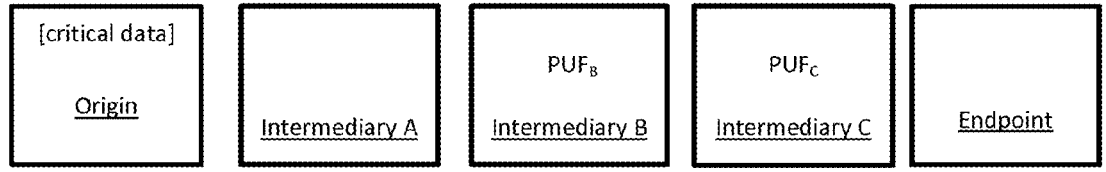

An encrypted-backup device according to the invention includes a processor, a memory, information providing a unique hardware identity, and typically an external input and external output. Information is extracted from the device uniquely identifying its hardware using a suitable means, for example via a PUF constructed to ensure that a unique value/identity is made for each and every device produced. Methods for extracting a unique hardware device identity utilizing a PUF challenge-response pair are described in various publications including U.S. Patent Application Publication No. 20150134966 ("the '966 Publication"); U.S. Pat. No. 8,468,186 to Yu, U.S. Pat. No. 8,811,615 to Yu et al., U.S. Pat. No. 8,756,438 to Devedas et al., U.S. Pat. No. 8,683,210 to Devedas et al., and U.S. Pat. No. 7,839,278 to Devedas et al.; Armknecht et al., "A formalization of the security features of physical functions," Proceedings of the 2011 IEEE Symposium on Security and Privacy, ser. SP '11. Washington, D.C.: IEEE Computer Society, pp. 397-412; Frikken et al., "Robust authentication using physically unclonable functions," Information Security, ser. Lecture Notes in Computer Science, vol. 5735, pp. 262-277 (Springer Berlin Heidelberg, 2009); Gassend et al., "Silicon physical random functions," Proceedings of the $9^{th}$ ACM conference on Computer and communications security, ser. CCS '02, pp. 148-60 (New York, ACM, 2002); Holcomb et al., "Initial sram state as a fingerprint and source of true random numbers for rfid tags," Proceedings of the Conference on RFID Security (2007); Kumar et al., "Extended abstract: The butterfly puf protecting ip on every fpga," Hardware-Oriented Security and Trust, HOST 2008, IEEE International Workshop, pp. 67-70; Rührmair et al., "Applications of high-capacity crossbar memories in cryptography," IEEE Trans. Nanotechnol., vol. 10, no. 3, pp. 489-498 (May 2011); Rührmair et al., "Pufs in security protocols: Attack models and security evaluations," 2013 IEEE Symposium on Security and Privacy, pp. 286-300 (2013); Suh et al., "Physical unclonable functions for device authentication and secret key generation," Proceedings of the $44^{th}$ annual Design Automation Conference, ser. DAC '07, pp. 9-14 (New York, ACM, 2007), which are incorporated herein by reference in that regard (including for their disclosure of PUF design properties, formal theoretical models, design protocols, and definitions). A PUF response used to uniquely identify the specific hardware device may be derived from a raw PUF response to the challenge, such as by fuzzy extraction described in the '966 Publication at ¶¶[0054]-0057] and [0086]-[0088]; Dodis et al., "Fuzzy extractors: How to generate strong keys from biometrics and other noisy data," SIAM J. Comput., vol. 38, no. 1, pp. 97-139 (2008); and Juels et al., "A fuzzy commitment scheme," Proceedings of the 6th ACM conference on Computer and communications security, ser. CCS '99, pp. 28-36 (New York, ACM 1999). The device's PUF may preferably be a controlled PUF configured and arranged so as to preclude release of PUF response data outside the device.

This hardware identity of the specific device is then used to generate a unique encryption key that is recoverable only by that device. Such an encryption key can comprise, or be generated from a seed comprising, the response of a PUF in the device to a given challenge. The data that is desired to be backed-up is next encrypted, using the encryption key directly in a symmetric encryption algorithm, or using it to derive an asymmetric key pair for an asymmetric encryption algorithm.

To decrypt the HWLE-BU, the specific device used to create it must regenerate the encryption key, in the case of a PUF-based key by utilizing the same challenge to generate the PUF response (e.g., with fuzzy extraction applied to the raw PUF response) used to make the key. Since only the specific device used to make the HWLE-BU can recreate the encryption key and decrypt the data that was backed-up, and since the device's hardware identity never exists outside of that device, the encrypted data can be viewed as a "black object." An object of this type can be treated as non-sensitive, including being stored (possibly in multiple copies, depending on applicable conditions and policies) on alternate media as a secure backup, and managed and distributed by IT administrators and others without risk of exposing the data encrypted therein. For example, the encrypted backup can be stored on a separate non-volatile memory within the device that made the backup, and/or may be transferred and stored externally to the device.

Figure 2:
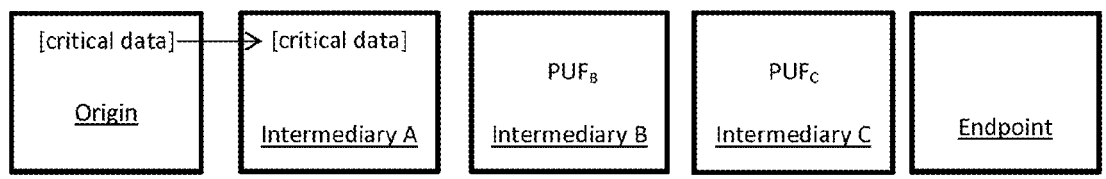
Figure 3:
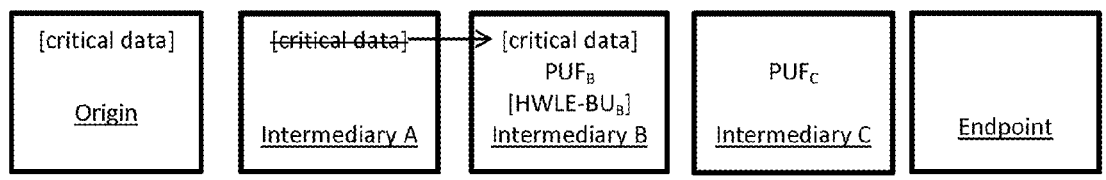
Figure 4:
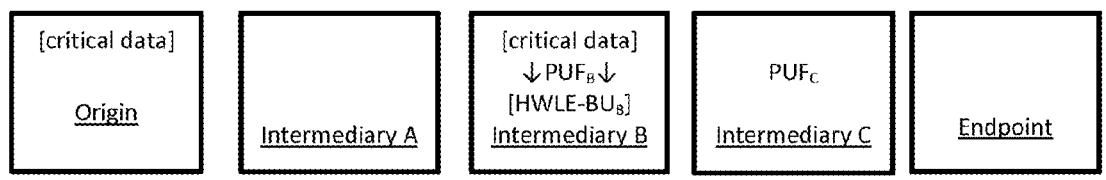
Figure 5:
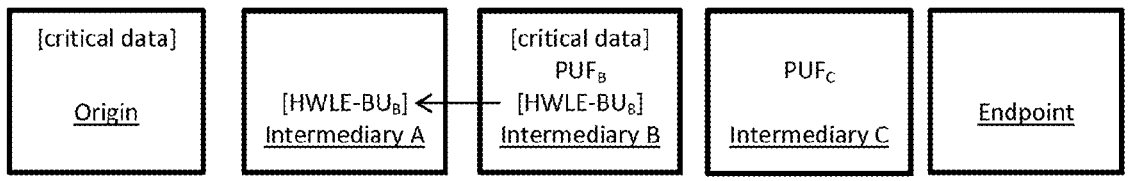
Figure 6:
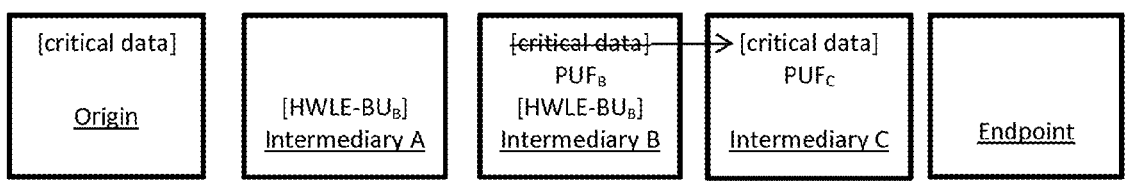
Figure 7:
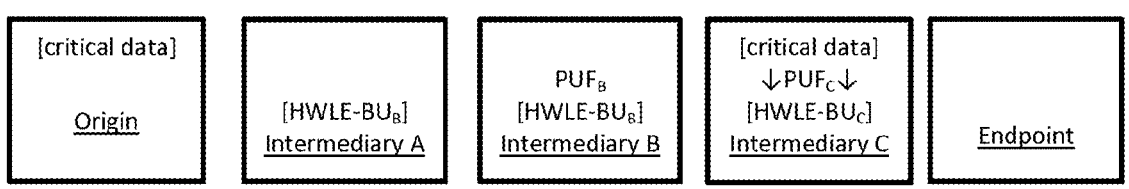
Figure 8:
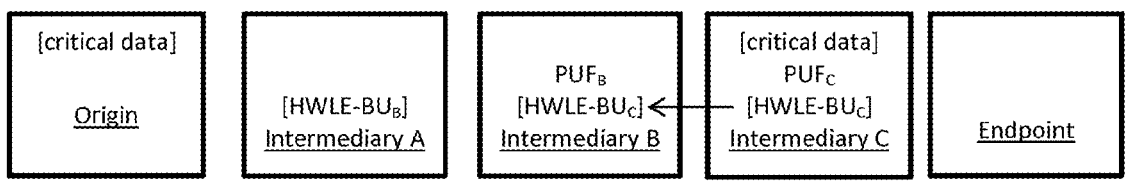
Figure 9:
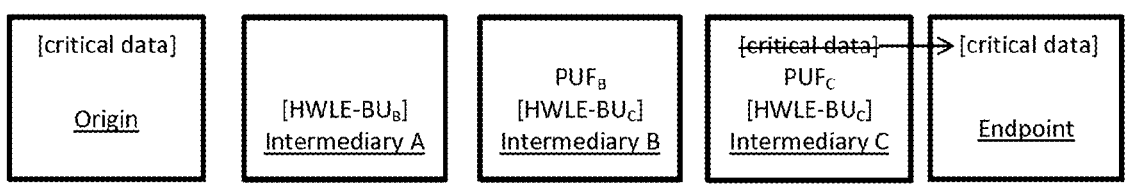

The HWLE-BU can be advantageous in environments (e.g., high-security critical/classified) where policies may prevent multiple copies of critical data and require that the originating copy of critical data be securely erased upon transfer to another device. For example, where critical data (e.g., cryptographic keys for use in an end cryptographic unit or keyloader) is transferred through a multiple-step path from an origin device or system to an endpoint device or system, the requirement of secure erasure can carry the risk of losing critical data or at least a set-back in the transfer process if a failure (battery loss, etc.) occurs in the transfer path. For example, in a transfer process such as the one shown in FIGS. 1-9, wherein conditions or policies require destruction of critical data usable by an intermediary device or system upon its transfer of critical data to the next recipient (such that failure could require re-starting the transfer process, potentially including one or more parties sequentially having to go to a different location again and connect to the origin and other intermediaries to each other etc.), the data could be transferred using intermediary devices or systems having internal PUFs used to create hardware-locked encrypted backups; a backup could then be sent back to the prior intermediary device or system in case of failure. Thus, if intermediary B has a failure, it can go back to intermediary A (without intermediary A first having to go back to the Origin) and retrieve from it and decrypt HWLE-BU$_B$ to regain the critical data and transfer it to intermediary C. Likewise, if intermediary C has a failure, it can go back to intermediary B (without intermediary A first having to go back to the Origin System and then intermediary B back to intermediary A) and retrieve from it and decrypt HWLE-BU$_C$ to regain the critical data and transfer it to the Endpoint. Once the entire transfer process or at least the next step in the chain is successfully completed, the backups may be destroyed. Further variations and adaptations can be employed depending on the system and policies; for example, in the foregoing example the critical data optionally may, at each step of the transfer path, be parsed into portions that are individually encrypted, transferred, and destroyed sequentially one after another.

Various other methods of backup and alternative embodiments can be adapted to a particular environment and type of data management or transfer.

What is claimed is:

1. An intermediary device for securely transferring sensitive data from a prior device to a subsequent device, the intermediary device being connectable to the prior device and to the subsequent device and comprising:
   a processor;
   a memory; and
   a hardware identify circuit configured to generate unique identifying information based on physical characteristics of the intermediary device's hardware;
   wherein the processor is configured to:
      receive sensitive data from the prior device;
      generate a cryptographic key using the unique identifying information generated based on physical characteristics of the intermediary device's hardware, wherein an act of decrypting regenerates the cryptographic key with the unique identifying information and limits the regeneration of the cryptographic key to require access to the intermediary device and the unique identifying information;
      encrypt a copy of the sensitive data with the generated cryptographic key;
      transfer the intermediary device's encrypted copy of the sensitive data back to the prior device for storage, wherein the prior device does not possess the cryptographic key used to encrypt the intermediary device's encrypted copy;
      transfer the sensitive data to the subsequent device; and
      responsive to the transfer of the sensitive data, erase the received sensitive data from the memory of the intermediary device.

2. The intermediary device of claim 1, further configured to, in response to a failure involving the intermediary device, connect to the prior device, retrieve the intermediary device's encrypted copy of the sensitive data stored in the prior device, decrypt the retrieved intermediary device's encrypted copy so as to reconstitute the sensitive data, and store the reconstituted sensitive data in the memory pending transfer of the sensitive data to the subsequent device.

3. The intermediary device of claim 1, further configured to receive an encrypted copy of the sensitive data from the subsequent device and to store the subsequent device's encrypted copy in the memory in case of a failure involving the subsequent device, wherein the intermediary device does not possess the cryptographic key used to encrypt the subsequent device's encrypted copy.

4. The intermediary device of claim 3, further configured to erase the subsequent device's encrypted copy of the sensitive data from the memory of the intermediary device upon completion of a desired transfer of the sensitive data.

5. The intermediary device of claim 1, wherein the intermediary device is configured to securely erase data after transferring the intermediary device's encrypted copy back to the prior device and transferring the sensitive data to the subsequent device.

6. The intermediary device of claim 1, wherein the sensitive data includes one or more cryptographic keys for use with a keyloader.

7. The intermediary device of claim 1, wherein the unique identifying information specific to the intermediary device's hardware resides in a physical unclonable function ('PUF').

8. The intermediary device of claim 7, wherein the PUF is a controlled PUF.

9. The intermediary device of claim 7, further configured to issue a challenge to the PUF and to use the corresponding response of the PUF as the cryptographic key.

10. A computer-implemented method of transferring data, the method comprising:
   receiving, by an intermediary device, sensitive data from a prior device;
   generating, by the intermediary device, a cryptographic key using unique identifying information generated based on physical characteristics of the intermediary device's hardware, wherein an act of decrypting regenerates the cryptographic key with the unique identifying information and limits regeneration of the cryptographic key to require access to the intermediary device and the unique identifying information;
   encrypting, by the intermediary device, a copy of the sensitive data with the generated cryptographic key;
   transferring, by the intermediary device, the intermediary device's encrypted copy of the sensitive data back to the prior device for storage, wherein the prior device does not possess the cryptographic key used to encrypt the intermediary device's encrypted copy;
   transferring, by the intermediary device, the sensitive data to the subsequent device; and
   responsive to the transfer of the sensitive data, erasing, by the intermediary device, the received sensitive data from a memory of the intermediary device.

11. The method of claim 10, further comprising the following acts in response to a failure involving the intermediary device:
   connecting, by the intermediary device, to the prior device;
   retrieving, by the intermediary device, the intermediary device's encrypted copy of the sensitive data stored in the prior device;
   decrypting, by the intermediary device, the retrieved intermediary device's encrypted copy so as to reconstitute the sensitive data; and
   storing, by the intermediary device, the reconstituted sensitive data in the memory of the intermediary device pending transfer of the sensitive data to the subsequent device.

12. The method of claim 10, further comprising:
   receiving, by the intermediary device, an encrypted copy of the sensitive data from the subsequent device; and
   storing, by the intermediary device, the subsequent device's encrypted copy in the memory of the intermediary device in case of a failure involving the subsequent device, wherein the intermediary device does not possess the cryptographic key used to encrypt the subsequent device's encrypted copy.

13. The method of claim 12, further comprising erasing, by the intermediary device, the subsequent device's encrypted copy of the sensitive data from the memory of the intermediary device upon completion of a desired transfer of the sensitive data.

14. The method of claim 10, further comprising securely erasing, by the intermediary device, data after transferring the intermediary device's encrypted copy back to the prior device and transferring the sensitive data to the subsequent device.

15. The method of claim 10, wherein the sensitive data includes one or more cryptographic keys for use with a keyloader.

16. The method of claim 10, wherein the unique identifying information specific to the intermediary device's hardware resides in a physical unclonable function (PUF).

17. The method of claim 16, wherein the PUF is a controlled PUF.

18. The method of claim 16, wherein the act of generating the cryptographic key further comprises issuing a challenge to the PUF and using the corresponding response of the PUF as the cryptographic key.

19. At least one non-transitory storage medium storing process-executable instructions that, when executed, perform a method comprising:
   receiving sensitive data from a prior device;
   generating a cryptographic key using unique identifying information generated based on physical characteristics of an intermediary device's hardware, wherein an act of decrypting regenerates the cryptographic key with the unique identifying information and limits regeneration of the cryptographic key to require access to the intermediary device and the unique identifying information;
   encrypting a copy of the sensitive data using the generated cryptographic key;
   transferring the encrypted copy of the sensitive data back to the prior device for storage, wherein the prior device does not possess the cryptographic key used to encrypt the intermediary device's encrypted copy;
   transferring the sensitive data to a subsequent device; and
   responsive to the transfer of the sensitive data, erasing the received sensitive data from a memory of the intermediary device.

20. The method of claim 19, further comprising the following acts in response to a failure involving the intermediary device:
   connecting to the prior device;
   retrieving the encrypted copy of the sensitive data stored in the prior device;
   decrypting the retrieved intermediary device's encrypted copy so as to reconstitute the sensitive data; and
   storing the reconstituted sensitive data in the memory of the intermediary device pending transfer of the sensitive data to the subsequent device.

* * * * *